US012802173B2

(12) United States Patent
Zhou et al.

(10) Patent No.: US 12,802,173 B2
(45) Date of Patent: Nov. 17, 2026

(54) METHODS AND SYSTEMS FOR IMAGE GENERATION

(71) Applicant: ZHEJIANG DAHUA TECHNOLOGY CO., LTD., Hangzhou (CN)

(72) Inventors: Xiangming Zhou, Hangzhou (CN); Peng Huang, Hangzhou (CN); Li Wu, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 226 days.

(21) Appl. No.: 18/925,012

(22) Filed: Oct. 23, 2024

(65) Prior Publication Data

US 2025/0045878 A1 Feb. 6, 2025

Related U.S. Application Data

(63) Continuation of application No. PCT/CN2022/107977, filed on Jul. 26, 2022.

(30) Foreign Application Priority Data

May 19, 2022 (CN) ........................ 202210553244.7

(51) Int. Cl.
*G06T 5/50* (2006.01)
*G06N 3/045* (2023.01)
(Continued)

(52) U.S. Cl.
CPC ............... *G06T 5/50* (2013.01); *G06N 3/045* (2023.01); *G06T 7/12* (2017.01); *G06T 7/13* (2017.01);
(Continued)

(58) Field of Classification Search
None
See application file for complete search history.

(56) References Cited

U.S. PATENT DOCUMENTS

| | | | | |
|---|---|---|---|---|
| 2021/0118112 | A1* | 4/2021 | Huang | G06N 20/00 |
| 2021/0209423 | A1* | 7/2021 | Yao | G06F 18/2148 |
| 2021/0390335 | A1* | 12/2021 | Du | G06N 3/0475 |

FOREIGN PATENT DOCUMENTS

| | | | |
|---|---|---|---|
| CN | 108564103 | A | 9/2018 |
| CN | 109145981 | A | 1/2019 |

(Continued)

OTHER PUBLICATIONS

The Extended European Search Report in European Application No. 22942323.1 mailed on Jul. 15, 2025, 10 pages.

(Continued)

*Primary Examiner* — Leon Flores
(74) *Attorney, Agent, or Firm* — METIS IP LLC

(57) ABSTRACT

The present disclosure provides a method and a system for image generation. The method may include: obtaining an initial image, the initial image being an image generated by a generator and including a specified target; determining, in the initial image, a partial image of the specified target; generating a fusion image including the specified target by performing an image fusion based on a background image and the partial image of the specified target; and generating a target sample image based on the fusion image.

18 Claims, 14 Drawing Sheets

(51) Int. Cl.
*G06T 7/12* (2017.01)
*G06T 7/13* (2017.01)

(52) U.S. Cl.
CPC ............... *G06T 2207/20081* (2013.01); *G06T 2207/20221* (2013.01)

(56) References Cited

FOREIGN PATENT DOCUMENTS

| | | | |
|---|---|---|---|
| CN | 109190750 | A | 1/2019 |
| CN | 110516514 | A | 11/2019 |
| CN | 111415316 | A | 7/2020 |
| CN | 111951154 | A | 11/2020 |
| CN | 112258504 | A | 1/2021 |
| CN | 112966742 | A | 6/2021 |
| CN | 113012054 | A | 6/2021 |
| CN | 113516615 | A | 10/2021 |
| CN | 113628159 | A | 11/2021 |
| CN | 113658036 | A | 11/2021 |
| CN | 113936135 | A | 1/2022 |

OTHER PUBLICATIONS

International Search Report in PCT/CN2022/107977 mailed on Jan. 18, 2023, 4 pages.
Written Opinion in PCT/CN2022/107977 mailed on Jan. 18, 2023, 4 pages.

* cited by examiner

300

METHODS AND SYSTEMS FOR IMAGE GENERATION

CROSS-REFERENCE TO RELATED APPLICATIONS

This application is a continuation of International Application No. PCT/CN2022/107977, filed on Jul. 26, 2022, which claims priority of Chinese Patent Application No. 202210553244.7, filed on May 19, 2022, the entire contents of each of which are incorporated herein by reference.

TECHNICAL FIELD

The present disclosure generally relates to a field of image processing, and in particular, to methods and systems for image generation.

BACKGROUND

Target detection is a key direction of the vision task, and its main tasks include locating and classifying targets in images. With the development of deep learning, a target detection algorithm based on deep learning emerges and achieve expected results, and is gradually applied in various fields, such as intelligent assisted driving, intelligent robots, and intelligent security. The target detection algorithm based on deep learning usually needs to use a large amount of sample image data including targets to be detected to train a machine learning model. However, the sample image data of some specific types of targets (such as rare animals, rare items, etc.) often has problems such as inability to obtain, long collection period, or high cost. When the amount of sample image data is small, it will cause problems such as failure to complete the training purpose and poor detection performance of deep learning. Therefore, it is desirable to provide methods and systems for image generation, which generate images including specified targets for training of the target detection algorithm.

SUMMARY

One of the embodiments of the present disclosure provides a method for image generation. The method includes: obtaining an initial image, the initial image being an image generated by a generator and including a specified target; determining, in the initial image, a partial image of the specified target; generating a fusion image including the specified target by performing an image fusion based on a background image and the partial image of the specified target; and generating a target sample image based on the fusion image.

One of the embodiments of the present disclosure provides a system for image generation. The system includes: at least one storage device including a set of instructions; and at least one processor in communication with the at least one storage device, wherein when executing the set of instructions, the at least one processor is directed to perform operations including: obtaining an initial image, the initial image being an image generated by a generator and including a specified target; determining, in the initial image, a partial image of the specified target; generating a fusion image including the specified target by performing an image fusion based on a background image and the partial image of the specified target; and generating a target sample image based on the fusion image.

One of the embodiments of the present disclosure provides a non-transitory computer readable medium. The non-transitory computer readable medium includes at least one set of instructions, when executed by one or more processors of a computing device, the at least one set of instructions causes the computing device to perform a method, the method comprising: obtaining an initial image, the initial image being an image generated by a generator and including a specified target; determining, in the initial image, a partial image of the specified target; generating a fusion image including the specified target by performing an image fusion based on a background image and the partial image of the specified target; and generating a target sample image based on the fusion image.

One of the embodiments of the present disclosure provides a system for image generation. The system includes: an image generation module configured to obtain an initial image, the initial image being an image generated by a generator and including a specified target; an image segmentation module configured to determine, in the initial image, a partial image of the specified target; an image fusion module configured to generate a fusion image including the specified target by performing an image fusion based on a background image and the partial image of the specified target; and an edge processing module configured to generate a target sample image based on the fusion image.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
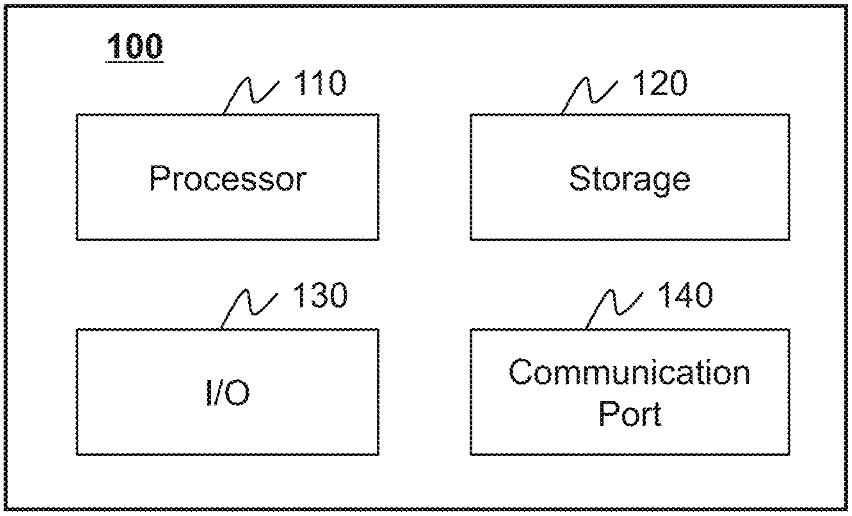
FIG. 1 is a schematic diagram illustrating exemplary hardware and/or software components of an exemplary processing device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms “system,” “engine,” “unit,” “module,” and/or “block” used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms “a,” “an,” and “the” may be intended to include the plural forms as well, unless the context clearly indicates otherwise. It will be further understood that the terms “include” and/or “comprise,” when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating exemplary hardware and/or software components of a processing device 100 according to some embodiments of the present disclosure. In some embodiments, the server 52 in FIG. 5 may be implemented on the processing device 100.

As illustrated in FIG. 1, the processing device 100 may include a processor 110, a storage device 120, an input/output (I/O) 130, and a communication port 140. The processor 110 may execute computer instructions (e.g., program code) and perform functions of the processing device 100 in accordance with techniques described herein. The computer instructions may include, for example, routines, programs, objects, components, data structures, procedures, modules, and functions, which perform particular functions described herein.

In some embodiments, the processor 110 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the processing device 100. However, it should be noted that the processing device 100 in the present disclosure may also include multiple processors. Thus operations and/or method steps that are performed by one processor as described in the present disclosure may also be jointly or separately performed by the multiple processors. For example, if in the present disclosure the processor of the computing device 100 executes both operation A and operation B, it should be understood that operation A and operation B may also be performed by two or more different processors jointly or separately in the computing device 100 (e.g., a first processor executes operation A and a second processor executes operation B, or the first and second processors jointly execute operations A and B).

The storage device 120 may store data/information obtained from the processor 110, the I/O 130, the communication port 140, and/or any other component of the processing device 100. In some embodiments, the storage device 120 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 120 may store one or more programs and/or instructions to perform exemplary methods described in the present disclosure.

The I/O 130 may input and/or output signals, data, information, etc. In some embodiments, the I/O 130 may enable a user interaction with the processing device 100. In some embodiments, the I/O 130 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 140 may be connected to a network (e.g., the communication network in FIG. 5) to facilitate data communications. The communication port 140 may establish connections between the processing device 100 and one or more other components (e.g., the collector 51 in FIG. 5). The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 140 may be and/or include a standardized communication port, such as RS232, RS485, etc.

Figure 2:
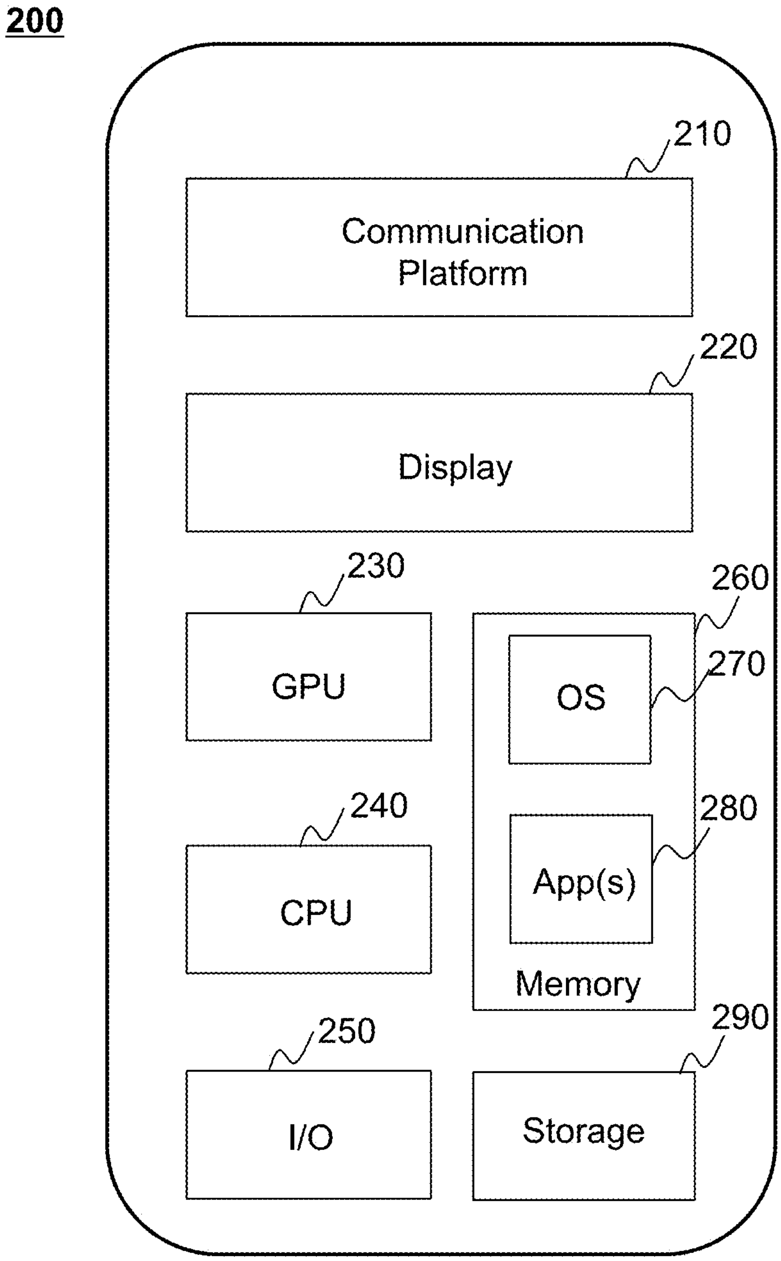
FIG. 2 is a schematic diagram illustrating exemplary hardware and/or software components of an exemplary terminal device according to some embodiments of the present disclosure.

FIG. 2 is a schematic diagram illustrating exemplary hardware and/or software components of an exemplary terminal device 200 according to some embodiments of the present disclosure.

As illustrated in FIG. 2, the terminal device 200 may include a communication platform 210, a display 220, a graphic processing unit (GPU) 230, a central processing unit (CPU) 240, an I/O 250, a memory 260, and a storage 290. In some embodiments, any other suitable component, including but not limited to a system bus or a controller (not shown), may also be included in the terminal device 200.

In some embodiments, an operating system 270 (e.g., iOS™, Android™, Windows Phone™) and one or more applications (Apps) 280 may be loaded into the memory 260 from the storage 290 in order to be executed by the CPU 240. The applications 280 may include a browser or any other suitable mobile apps for receiving and rendering information relating to image generation or other information. User interactions may be achieved via the I/O 250.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal. A computer may also act as a server if appropriately programmed.

Figure 3:
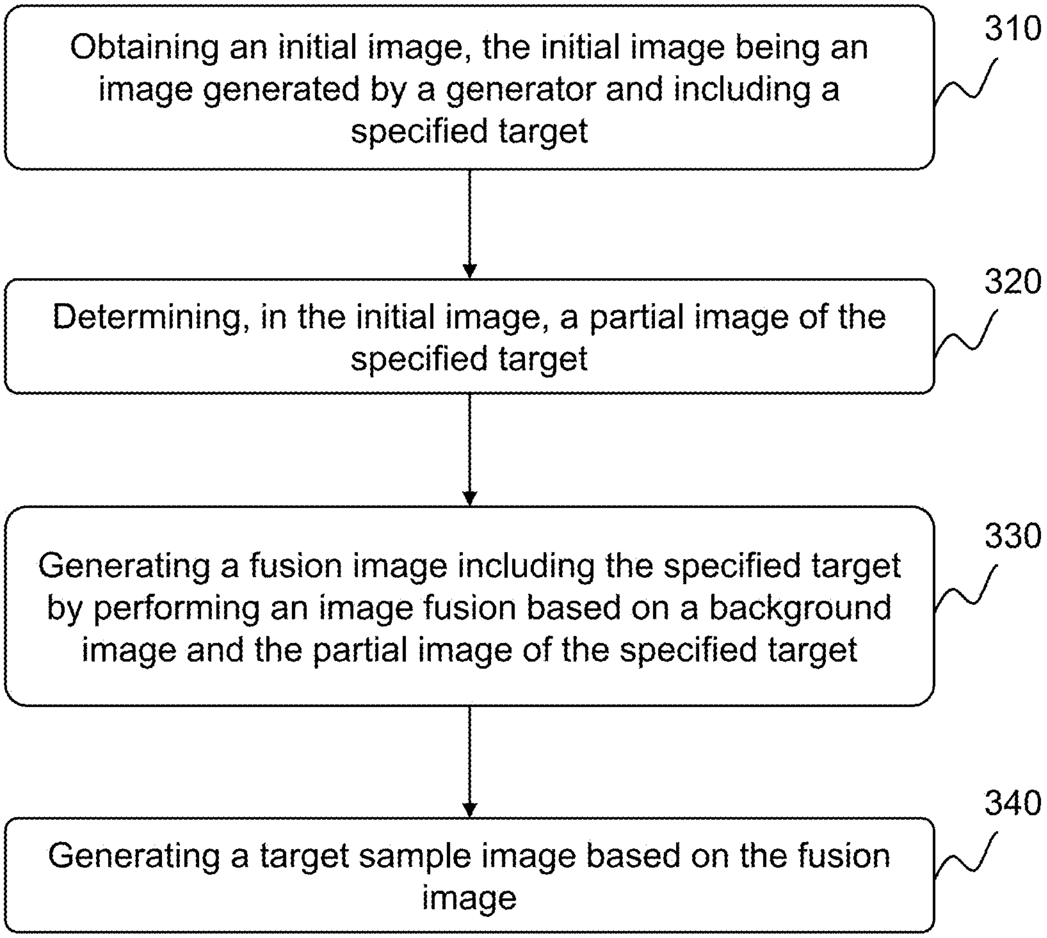
FIG. 3 is a flowchart illustrating an exemplary process for image generation according to some embodiments of the present disclosure.

FIG. 3 is a flowchart illustrating an exemplary process for image generation according to some embodiments of the present disclosure. In some embodiments, the process 300 may be stored in a storage device (e.g., the storage device 120 and/or the storage 290) as a form of instructions, and invoked and/or executed by a processing device (e.g., the processor 110 of the processing device 100, the CPU 240 and/or the GPU 230 of the terminal device 200, or one or more modules illustrated in FIG. 12). The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

In 310, a processor (e.g., the processing device 100, the terminal device 200, or the server 52) may obtain an initial image. The initial image may be an image generated by a generator and include a specified target.

The specified target may refer to any pre-specified target, for example, a human body, a dog, a car, etc. The type of the specified target may be related to a target that needs to be detected. For example, when it is necessary to obtain a machine learning model for detecting a human body in an image, the specified target may include a human body.

Figure 4A:
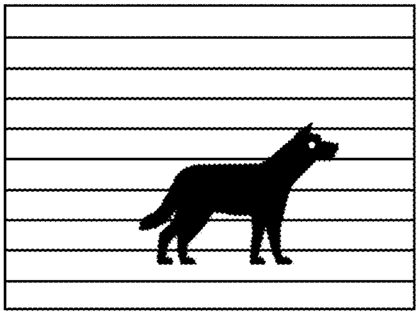
FIG. 4A is a diagram illustrating an exemplary initial image according to some embodiments of the present disclosure.

In some embodiments, an image including the specified target may be generated based on a generator. The image including the specified target generated by the generator may be called an initial image. In some embodiments, the initial image may only include the specified target (e.g., the specified target is a rectangular object of the same size as the initial image). In some embodiments, the initial image may also include other content than the specified target (e.g., simple backgrounds such as shading in various colors, etc.). In general, most content of the initial image is the specified target, and a small part of the initial image is other content. As shown in FIG. 4A, the initial image includes a specified target "a dog" and a background of stripes.

The input of the generator may be an input image, and the output of the generator may be the initial image. The input image may be various types of images obtained by the processor in various ways. For example, the input image may be a noise image generated randomly.

For each specified target, the processor may obtain a generator for generating an initial image including the specified target. For example, when the specified target is a panda, the processor may obtain a generator for generating an initial image including the panda. When the specified target is a tiger, the processor may obtain a generator for generating an initial image including the tiger.

In some embodiments, the processor may obtain the generator in various feasible ways. For example, the processor obtains various generators (which may be considered as trained generators) for generating initial images including various specified targets from other places, and the processor may also obtain various generators through a training process for generating initial images including various specified targets.

In some embodiments, the training process of the generator includes training a generative adversarial network that includes a generator and a discriminator. The task of the generator is to generate an initial image including the specified target based on the input image. The task of the discriminator is to determine whether the specified target in the received image is real or false after receiving an image including a specified target (e.g., an image including a real specified target or an initial image generated by the generator). In the training process of the generative adversarial network, the goal of the generator is to try to generate an initial image to be input to the discriminator with a high similarity to the real specified target, so that the discriminator cannot recognize that the specified target in the input initial image is real or false. The goal of the discriminator is to try to distinguish whether the specified target in the initial image is real or false. In the training process of the generative adversarial network, the generator and the discriminator may form a dynamic game process. The capabilities of the generator and the discriminator may become stronger and stronger through continuous training, and finally the generative adversarial network reaches convergence and a trained generator is obtained. When the generative adversarial network finally converges, the discriminator considers the specified target in the input image to be real.

In some embodiments, the training of the generative adversarial network may be implemented in various feasible ways.

In some embodiments, a generative adversarial network may be trained based on a loss function. The loss function may be the following Equation (1):

$$\min_G \max_D V(D, G) = E_{x \sim p_{data}(x)}[\log D(x)] + E_{z \sim p_z(z)}[\log(1 - D(G(z)))] \quad (1)$$

where, G denotes a generator, D denotes a discriminator, E denotes an expected value, $p_{data}(x)$ denotes a distribution of an image including a real specified target, x denotes the image including the real specified target, $p_z(z)$ denotes a distribution of an input image, z denotes the input image, G(z) denotes an initial image generated by the generator, D(x) denotes an authenticity of an image received by the discriminator when the image includes the real specified target, and D (G(z)) denotes an authenticity of the image received by the discriminator when the image is the initial image.

In some embodiments, the processor may first train the generative adversarial network until a preset condition is met, and a generator with certain capabilities is obtained. The preset condition may include a convergence of a loss function, a training period reaching a threshold, and the like. The processor may execute the process 300 based on the aforementioned generator to obtain a target sample image. After obtaining the target sample image, the processor may continue to train the generative adversarial network again based on the aforementioned target sample image to enhance the ability of the generator to improve the authenticity of the specified target in the initial image output by the generator. When the processor trains the generative adversarial network again, the loss function used is based on Equation (1), and may also include additional loss terms. The aforementioned additional loss terms are related to a first target image feature and a second target image feature. The first target image feature may include a feature obtained by performing feature extraction on a partial image of the specified target segmented from the initial image output by the generator. The second target image feature may include a feature obtained by performing feature extraction on a partial image of the specified target segmented from the target sample image. The aforementioned feature extraction may be implemented by various feasible algorithms, for example, a Local Binary Patterns (LBP) feature extraction algorithm, a Histogram of Oriented Gradient (HOG) feature extraction algorithm, etc. The aforementioned additional loss terms may include various feasible functions representing the similarity between two data. The goal of generative adversarial network training may include minimizing additional loss terms to reduce the difference between the first target image feature and the second target image feature.

Some embodiments of the present disclosure may improve the ability of the generator by retraining the generator based on the target sample image. At the same time, adding additional loss terms to the loss function may make the detailed features of the specified target in the initial image output by the generator more realistic, so that the specified target may be merged with the background image more naturally. Further, the final generated target sample image is more realistic.

In 320, the processor (e.g., the processing device 100, the terminal device 200, or the server 52) may determine, in the initial image, a partial image of the specified target.

The partial image of the specified target may refer to a partial image corresponding to the specified target in the initial image.

In some embodiments, the processor may determine the partial image of the specified target in the initial image in various feasible ways. When the initial image includes only the specified target (e.g., the specified target is a rectangular object with the same size as the initial image), the processor may directly determine the initial image as the partial image of the specified target. When the initial image includes other content than the specified target, the processor may detect an edge of the partial image of the specified target and segment the initial image to determine the partial image of the specified target.

In some embodiments, the processor may obtain an edge result of the partial image of the specified target in the initial image. The edge result may refer to a result obtained by detecting the edge of the specified target in the initial image. In some embodiments, the edge result may be an edge binary image. As shown in FIG. 4A, the processor may process the initial image shown in FIG. 4A to obtain the edge result shown in FIG. 4C. A white part in the edge result may represent the edge of the specified target, and a black part may represent the part of the initial image that is not the edge of the specified target.

In some embodiments, the processor may obtain the edge result of the partial image of the specified target in the initial image through various feasible edge detection algorithms.

In some embodiments, the processor may process the initial image through a target edge segmentation network to obtain the edge result of the partial image of the specified target. The input of a segmentation model of a target edge may include the initial image, and the output may include the edge result of the partial image of the specified target. The segmentation model of a target edge may include various feasible models such as BASNet and a convolutional neural network. For more information about the training of the target edge segmentation network, please refer to FIG. 7 and its related descriptions.

Figure 4B:
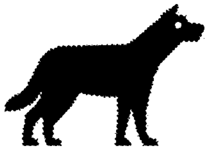
FIG. 4B is a diagram illustrating an exemplary partial image of the specified target according to some embodiments of the present disclosure.
Figure 4C:
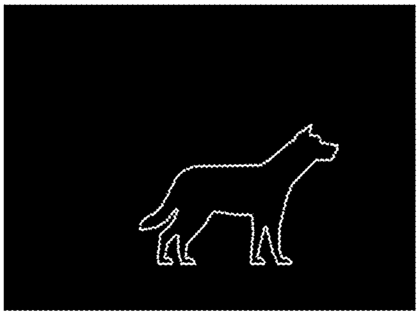
FIG. 4C is a diagram illustrating an exemplary edge result according to some embodiments of the present disclosure.

In some embodiments, the processor may remove, based on the aforementioned edge result, contents other than the specified target in the initial image, so as to obtain the partial image of the specified target. As shown in FIG. 4A, the specified target in the initial image is a dog, and the processor may remove contents other than the dog in the initial image to obtain the partial image of the specified target as shown in FIG. 4B.

In 330, the processor (e.g., the processing device 100, the terminal device 200, or the server 52) may generate a fusion image including the specified target by performing an image fusion based on a background image and the partial image of the specified target.

The background image may be an image including a background. The background may include various types of figures or objects. In some embodiments, the background image may be obtained in various ways. For example, the background image may be obtained by specifying in advance. For another example, the processor may perform retrieval based on preset themes, such as forests, supermarkets, etc., and obtain a corresponding image as a background image.

In some embodiments, the processor may perform image fusion based on the obtained background image and the partial image of the specified target. In some embodiments, an image obtained through the aforementioned image fusion may be referred to as a fusion image.

Figure 4D:
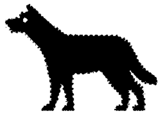
FIG. 4D is a diagram illustrating an exemplary changed partial image of a specified target according to some embodiments of the present disclosure.

In some embodiments, the processor may perform a change processing on the partial image of the specified target to obtain a changed partial image of the specified target. The aforementioned change processing may include one or more of the following: a size change (e.g., reducing or enlarging the partial image of the specified target), a rotation change (e.g., adjusting the partial image of the specified target as shown in FIG. 4B and flip it horizontally to obtain the changed partial image of the specified target as shown in FIG. 4D), a noise addition (e.g., adding noise to the partial image of the specified target), an image brightness change (e.g., increasing or decreasing the brightness of the partial image of the specified target), an image color change (e.g., adjusting color parameters such as a saturation of the color of the partial image of the specified target), an image sharpness change (e.g., increasing or reducing the definition of the partial image of the specified target), or an image cropping (e.g., cropping the edge of the partial image of the specified target), etc. In some embodiments, the processor may determine the change processing for the partial image of the specified target based on a variety of approaches. For example, the processor may randomly perform the change processing on the partial image of the specified target.

In some embodiments, the processor may analyze the background image to determine the change processing that needs to be performed on the partial image of the specified target. By this method, the changed partial image of the specified target and the background image may be made more harmonious. For example, the processor may also analyze and process the background image, determine a proportional relationship between a size of the object in the background image and a size of the actual object, and according to the foregoing proportional relationship, adjust a size of the partial image of the specified target, and obtain the changed partial image of the specified target. For another example, the processor may analyze and process the background image, determine that the background image is a grayscale image, and then perform gray processing on the partial image of the specified target to obtain the changed partial image of the specified target.

By performing the change processing on the partial image of the specified target, it is possible to obtain the changed partial image of the specified target that is more diverse and more in line with the real complex situation.

Figure 4E:
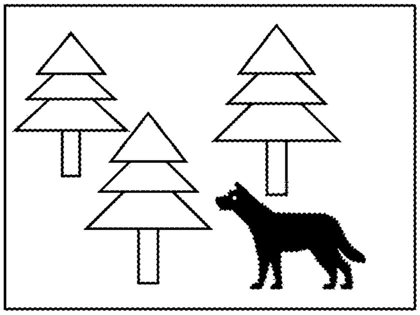
FIG. 4E is a diagram illustrating an exemplary target sample image according to some embodiments of the present disclosure.

In some embodiments, the processor may perform the image fusion based on the background image and the changed partial image of the specified target to obtain a fusion image. For example, the processor may fuse the partial image of the specified target as shown in FIG. 4D with a preset background image to obtain the fusion image as shown in FIG. 4E. By performing the image fusion based on the background image and the changed partial image of the specified target, the diversity and authenticity of the fusion image may be enhanced.

In some embodiments, the processor may perform the image fusion in various feasible ways. For example, the processor may determine a fusion region in the background image (the fusion region may be the same as the size and rotation angle, etc. of the partial image of the specified target or the changed partial image of the specified target), and then replace each pixel of the fusion region to the corresponding pixel of the partial image of the specified target or the changed partial image of the specified target, so as to obtain the fusion image. The fusion region may be randomly determined on the background image or determined by a user's specification.

In 340, the processor (e.g., the processing device 100, the terminal device 200, or the server 52) may generate a target sample image based on the fusion image.

In some embodiments, the generated image including the specified target and other background may be referred to as a target sample image. The target sample images may be used as training samples to train a machine learning model (which may be called a target detection model) for target detection. The target detection model may learn how to detect specified targets from images through the training based on target sample images. For example, the processor may generate a target box of the specified target and a target category corresponding to the target box based on the partial image of the specified target or the changed partial image of the specified target in the target sample image, and determine the target box and its corresponding target category as a label of the target sample image, and then the target detection model is trained based on the target sample image and its corresponding label.

In some embodiments, the processor may obtain the target sample image in various feasible ways based on the fusion image. For example, the processor may directly determine the fusion image as the target sample image.

In some embodiments, the processor may perform an optimization processing on the specified target in the fusion image based on the edge result of the partial image of the specified target or the changed partial image of the specified target in the fusion image to obtain the target sample image. The processor may perform the corresponding change processing (such as a size change, a rotation change, an image cropping, etc.) on the edge result of partial image of the specified target, so as to obtain the edge result of the changed partial image of the specified target.

In some embodiments, the aforementioned optimization processing may include one or more of the following: performing edge smoothing on the specified target in the fusion image (e.g., performing an edge smoothing processing on the specified target by Gaussian smoothing based on the edge result), performing a brightness adjustment on the specified target and/or the background image in the fusion image, performing a color adjustment on the specified target and/or the background image in the fusion image, and performing a sharpness adjustment on the specified target and/or the background image in the fusion image.

In some embodiments, the processor may analyze the specified target in the fusion image and the background image to determine one or more optimization processing that need to be performed. For example, the processor may analyze the brightness of the specified target and the background image in the fusion image, and determine that the brightness (or color parameters, sharpness, etc.) of the two are quite different, so the brightness (or color parameters, sharpness, etc.) of the specified target and/or the background image may be adjusted, so that the brightness (or color parameters, sharpness, etc.) of the specified target and the background image is similar or close to the real image situation.

In some embodiments of the present disclosure, the processor may make the specified target and background image in the fusion image closer to reality through the optimization processing such as edge smoothing, brightness adjustment, color adjustment, and sharpness adjustment, thereby obtaining a more realistic target sample image.

In some embodiments, the processor may obtain the target sample image through an image optimization model based on the edge result of the partial image of the specified target or the changed partial image of the specified target in the fusion image and the fusion image. The input of the image optimization model may include the edge result of the partial image of the specified target or the changed partial image of the specified target in the fusion image and the fusion image. The output of the image optimization model may include the target sample image. The aforementioned optimization processing of the fusion image may be achieved through the image optimization model.

In some embodiments, the processor may train the image optimization model based on a fourth set of training samples. The training samples of the fourth set of training samples may include sample edge results and sample fusion images, the labels of the training samples may include sample images (the sample images may be real images, such as real images obtained by shooting, etc.), and the sample images include targets (may be any targets). The training samples may be images with sample targets obtained by the processor in various ways. The processor may process the sample image to obtain the edge result of the target in the sample image (i.e., a sample edge result), an image of the target part in the sample image (i.e., an image of a sample target part), and the rest of the image except the image of the target part (i.e., a sample background image). The processor may perform the change processing on the image of the sample target part and/or the sample background image in the sample image, which may make the image effects of the two inconsistent, and the change processing includes one or more of the following: an edge sharpening, an edge change, a rotation change, a noise addition, an image brightness change, an image color change, an image sharpness change, or an image cropping, etc. The sample image processed through the aforementioned change processing may be used as a sample fusion image. The processor can input the sample edge results and the sample fusion images in the training samples in the fourth set of training samples as input data into the image optimization model, and then determine a value of the loss function (e.g., a loss function on the difference between the model output and the labels.) based on the output of the image optimization model and the labels corresponding to the input data. The processor may iteratively update the parameters of the image optimization model based on the value of the loss function until a preset condition is met, and the required image optimization model is obtained. The preset condition may include, but are not limited to, the convergence of the loss function, the training period reaching a threshold, and the like.

In some embodiments of the present disclosure, the processor may make the obtained target sample image be an image closer to the real image through the image optimization model.

In some embodiments, the processor may perform a plurality of iterations of the process 300 to obtain the target sample image including a plurality of specified targets (e.g., a plurality of different specified targets). When the processor performs a plurality of iterations of the process 300, the background image in a first iteration may be a specified background image, the background image in the Nth iteration may be the target sample image obtained in the previous iteration, and N is an integer greater than 1. For example, when the processor performs three iterations of the process 300, the background image in the third iteration may be the target sample image obtained in the second iteration. The target sample image obtained in the second iteration may include two specified targets.

In some embodiments of the present disclosure, the processor may perform a plurality of iterations of the process 300 to obtain the target sample image including a plurality of specified targets, which increases the diversity of target sample image, so that the machine learning model for target detection may be trained based on the aforementioned target sample image including a plurality of specified targets, so that the model learns the ability to detect multiple targets and improves the generalization ability of the model.

In some embodiments, the processor may generate a large number of diverse target sample images based on the process 300 or performing a plurality of iterations of the process 300. A large number of diverse target sample images may solve the problem that it is difficult to obtain training samples when training a target detection model.

In different parts of the present disclosure, a generative adversarial network may also be referred to as an adversarial generative network, an initial image may also be referred to as a target image, a fusion image may also be referred to as a candidate target image, and a target sample image may also be referred to as a target detection image.

The following contents (FIGS. 5-11) includes more specific instructions on the method for generating the target sample image (i.e., the target detection image).

At present, a target detection technology based on deep learning usually needs to use a large amount of sample data to complete the model training. However, some specific types of target sample data are often difficult or impossible to obtain, such as animal or special image data, etc. The images generated by GAN are only images corresponding to the target. For example, the target in the image accounts for 90% of the entire image, while most of the image used for target detection is background, and the target only occupies a small part. Therefore, in the field of deep learning target detection, how to generate more target detection images is a problem that needs to be studied at present for the situation where the data amount of some target detection images is small.

Therefore, to solve the above problems, the present disclosure provides a method, apparatus, device and medium for generating a target detection image, which solves the problem of small data amount of some target detection images in the field of deep learning target detection.

Figure 5:
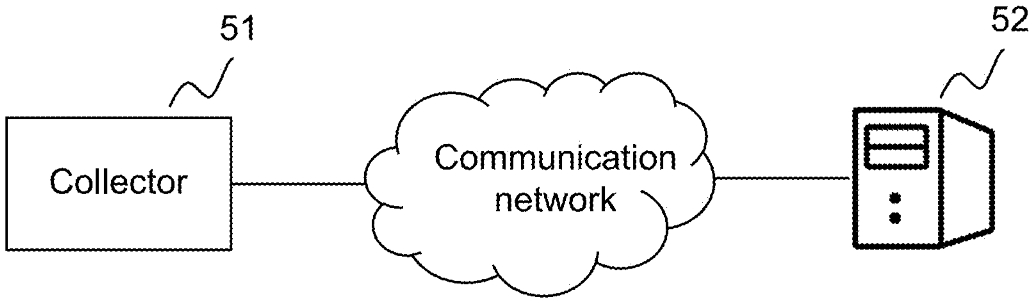
FIG. 5 is a schematic diagram of an exemplary application scenario according to some embodiments of the present disclosure.

FIG. 5 is a schematic diagram of an exemplary application scenario according to some embodiments of the present disclosure, including a collector 51 and a server 52. The collector 51 may include a camera, a camera of a mobile phone/computer, a video recorder, etc., and is used to collect images; the server 52 is used to generate target detection images according to the images collected by the collector 51.

In some embodiments of the present disclosure, the collector 51 sends a collected image to the server 52, and the server 52 uses a generative adversarial network to generate a target image of a specified target; performs an edge feature extraction on the target image to obtain an edge binary image corresponding to the target image; fuses a background image and a target image to obtain a candidate target image; processes the edge of the specified target included in the candidate target image according to the edge binary image to obtain a target detection image corresponding to the target image.

Some embodiment of the present disclosure provide a method for generating a target detection image. According to the same concept, some embodiments of the present disclosure further provide an apparatus, an electronic device, and a computer-readable storage medium for generating a target detection image.

Figure 6:
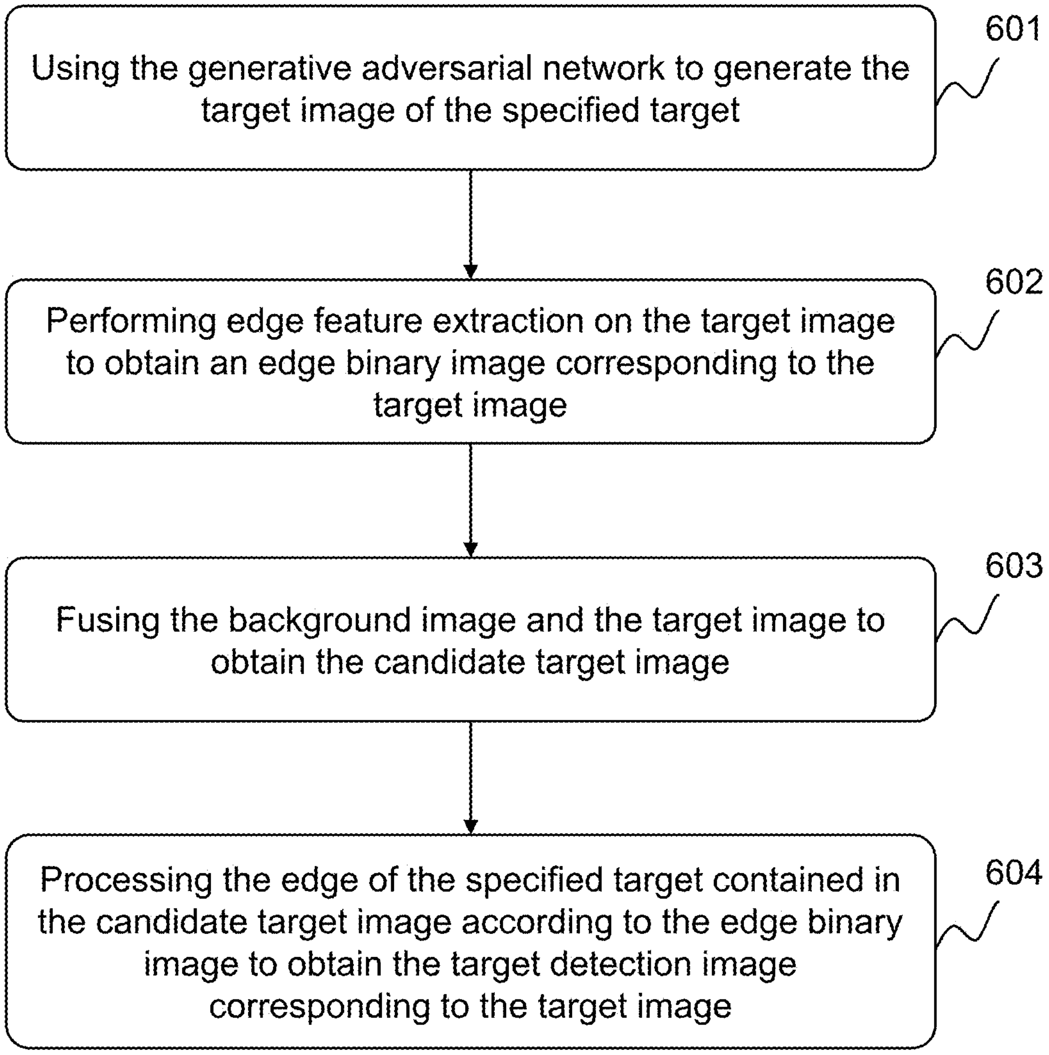
FIG. 6 is a flowchart illustrating an exemplary process for generating a target detection image according to some embodiments of the present disclosure.

The following describes a method for generating a target detection image provided by the present disclosure through specific embodiments. As shown in FIG. 6, the method includes the following operations.

In 601, a processor (e.g., the processing device 100, the terminal device 200, or the server 52) may use the generative adversarial network to generate the target image of the specified target.

The specified target may be determined according to requirements, which may be animals and the like.

According to the present disclosure, the generative adversarial network may be used to generate a plurality of target images of the specified target according to an image with the specified target, and the grayscales of the plurality of target images may be different.

The generative adversarial network (GAN) includes a generator and a discriminator, the generator is used to generate false images, the discriminator is used to distinguish whether the generated images are real images, the generator and the discriminator fight against each other, and finally reach a balance. The GAN in the disclosure may be a Deep Convolution Generative Adversarial Network (DC-GAN), a Least Squares Generative Adversarial Network (LSGAN), a Wasserstein Generative Adversarial Network (WGAN)), etc.

In 602, the processor (e.g., the processing device 100, the terminal device 200, or the server 52) may perform edge feature extraction on the target image to obtain an edge binary image corresponding to the target image.

The target image may be input into a target edge segmentation network to extract edge features, and an edge binary image corresponding to the target image output by the target edge segmentation network may be obtained.

In 603, the processor (e.g., the processing device 100, the terminal device 200, or the server 52) may fuse the background image and the target image to obtain the candidate target image.

Before operation 603, a random transformation processing may be performed on the target image.

The background image may be selected according to requirements.

In 604, the processor (e.g., the processing device 100, the terminal device 200, or the server 52) may process the edge of the specified target contained in the candidate target image according to the edge binary image to obtain the target detection image corresponding to the target image.

Before operation 604, the processor may perform a random transformation processing on the edge binary image.

In the present disclosure, the target image is generated by using GAN. Edge features are extracted from the target image, the corresponding edge binary image is obtained. The background image and the target image are fused to obtain the candidate target image. The edge of the specified target contained in the candidate target image is processed according to the edge binary image to obtain the target detection image corresponding to the target image. The present disclosure may generate more target detection images, and make the specified target more realistic in the background image, to solve the problem of how to generate target detection images due to the small data amount for some target detection images in the field of deep learning target detection. The present disclosure may be applied to a target detection algorithm, and greatly reduces the dependence of the target detection algorithm on the acquisition of target detection images.

The present disclosure provides a method for generating a target detection image, the specific steps of which are as follows.

First, the processor may use the generative adversarial network to generate the target image of the specified target.

Figure 7:
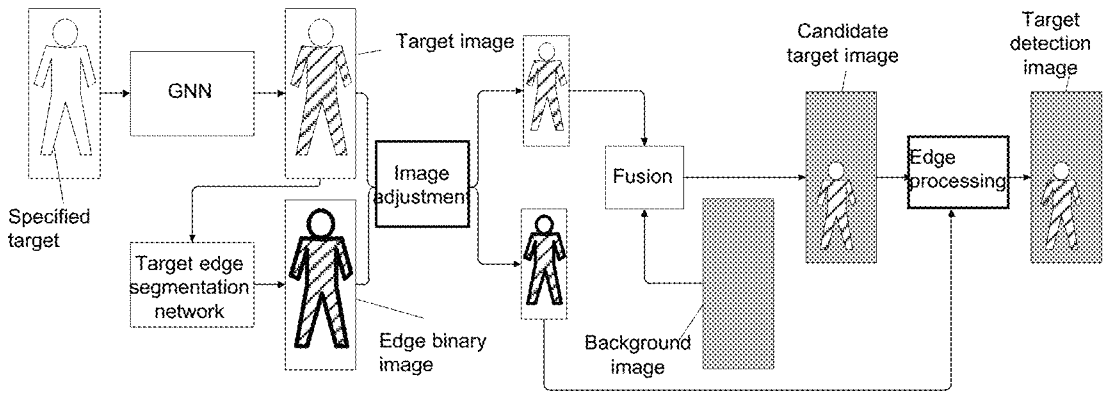
FIG. 7 is flowchart illustrating an exemplary process for generating a target detection image according to some embodiments of the present disclosure.

As shown in FIG. 7, the processor may first determine an image with a specified target, input the image into GAN, and obtain a target image output by GAN.

The GAN includes a generator and a discriminator, and the adversarial generative network is trained in the following ways.

The processor may obtain a first set of training samples, where the first set of training samples includes a plurality of first sample images with targets.

The processor may input each first sample image in the first set of training samples into the generator, to obtain the corresponding second sample image output by the generator, as a second set of training samples.

The first sample images in the first set of training samples and the corresponding second sample images in the second set of training samples are input to the discriminator, respectively, to distinguish, and the second sample image that cannot be distinguished by the discriminator is output as the goal to train the generative adversarial network.

Second, the processor may perform edge feature extraction on the target image to obtain an edge binary image corresponding to the target image.

The method for performing edge feature extraction on the target image to obtain an edge binary image corresponding to the target image is as follows.

The target image may be input into a target edge segmentation network to extract edge features, and an edge binary image corresponding to the target image output by the target edge segmentation network may be obtained.

As shown in FIG. 7, a target image is input into the target edge segmentation network, and the edge binary image output by the target edge segmentation network is obtained.

The edge binary image includes pixels of target edge part marked as a first marker value and pixels of non-edge part marked as a second marker value. For example, the pixels of target edge part are marked as 1, and pixels of non-edge part are marked as 0.

The target edge segmentation network is obtained by training in the following ways.

The processor may obtain a third set of training samples, where the third set of training samples includes a plurality of sample images with the edge binary images.

The processor may input each sample image in the third set of training samples into the segmentation model of the target edge, using the segmentation model of the target edge to extract edge features and predict the edge binary image, and outputting the corresponding edge binary image of the sample image as the goal to train the segmentation model of the target edge.

Third, the processor may fuse the background image and the target image to obtain the candidate target image.

Before the above operations, a random transformation processing is performed on the target image, mainly in the following three ways.

The first is to perform image size adjustment on the target image, and the size of the target image for the image size adjustment is less than or equal to the size of the background image.

Figure 8:
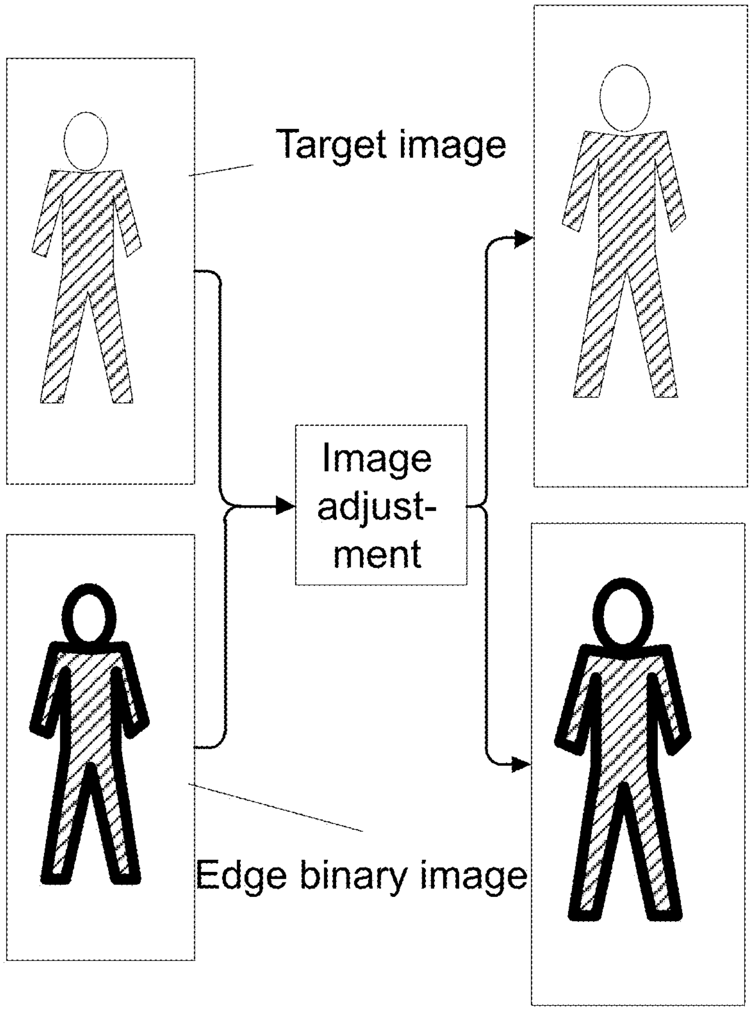
FIG. 8 is a schematic diagram illustrating an exemplary process for adjusting a size of a target image and an edge binary image according to some embodiments of the present disclosure.

As shown in FIG. 7, the size of the target image is reduced by a times, and as shown in FIG. 8, the size of the target image is enlarged by b times.

The second is to adjust the image rotation angle of the target image.

Figure 9:
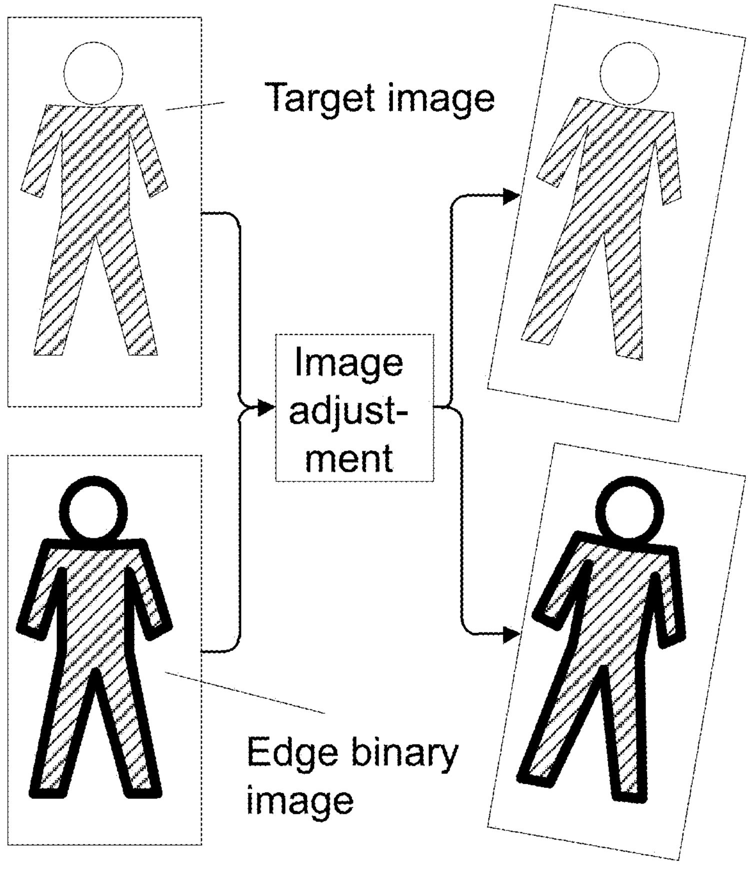
FIG. 9 is a schematic diagram illustrating an exemplary process for adjusting a rotation angle of a target image and an edge binary image according to some embodiments of the present disclosure.

Specifically, the rotation angle and rotation direction of the target image are adjusted, as shown in FIG. 9, and the target image is rotated to the right by c degrees.

The third is to perform a random noise processing on the target image. The specific method of random noise processing is in the prior art, and details are not repeated here.

In addition to the above three methods, other methods may also be used to perform the random transformation processing on the target image, such as a random cropping, and the like.

As shown in FIG. 7, a background image is randomly selected, and the background image and the target image are fused to obtain a candidate target image, wherein the target image is the target image after the random transformation processing.

The method for fusing the background image and the target image to obtain the candidate target image is as follows.

The processor may determine the fusion region of the specified target in the background image.

The pixels corresponding to the fusion region in the background image are replaced with the pixels corresponding to the target image to obtain the candidate target image. The specific method for determining the fusion region of the specified target in the background image is: in the region occupied by the background image, determining a fusion region with the same size and rotation angle as the specified target.

Figure 10:
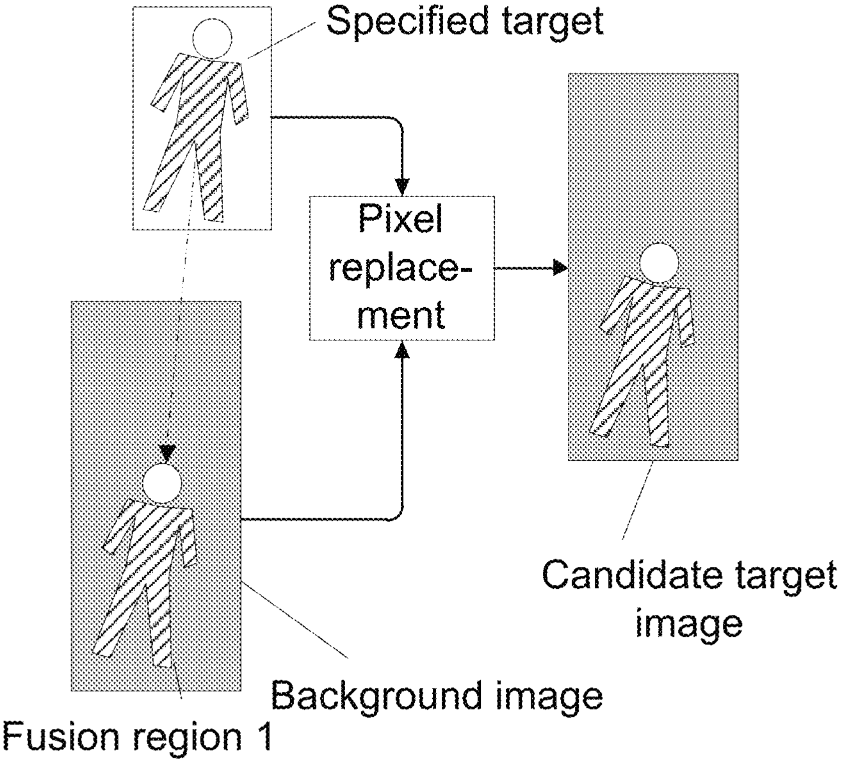
FIG. 10 is a schematic diagram illustrating an exemplary process for fusing a target image and a background image according to some embodiments of the present disclosure.

As shown in FIG. 10, if a target image is fused with a background image, in the region occupied by the background image, a fusion region 1 with the same size and rotation angle as the specified target in the target image is determined. The pixels corresponding to the fusion region 1 are replaced with the pixels corresponding to the specified target in the target image. Thereby, a candidate target image with a specified target is obtained.

Figure 11:
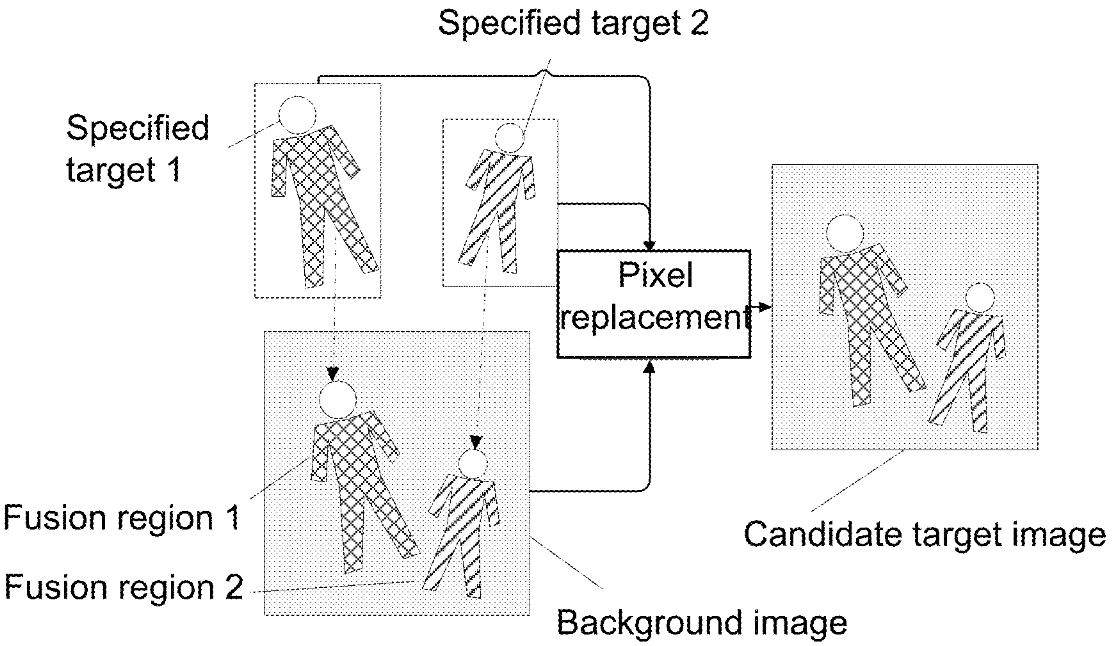
FIG. 11 is a schematic diagram illustrating an exemplary process for fusing a plurality of target images and a background image according to some embodiments of the present disclosure.

As shown in FIG. 11, if two target images are fused with a background image, in the region occupied by the background images, the fusion region 1 with the same size and rotation angle as the specified target 1 in the target image and a fusion region 2 with the same size and rotation angle as a specified target 2 in the other image are determined. The pixels corresponding to the fusion region 1 are replaced with the pixels corresponding to the specified target 1, and the pixels corresponding to the fusion region 2 are replaced with the pixels corresponding to the specified target 2. Thereby, a candidate target image with two specified targets is obtained.

Finally, the processor may process the edge of the specified target contained in the candidate target image according to the edge binary image to obtain the target detection image corresponding to the target image.

Before the above steps, a random transformation processing is performed on the edge binary image, mainly in the following two ways.

The first is to perform image size adjustment on the edge binary image, and the size of the edge binary image for the image size adjustment is less than or equal to the size of the background image.

As shown in FIG. 7, the size of the target image is reduced by a times, and the size of the corresponding edge binary image is also reduced by a times. As shown in FIG. 8, the size of the target image is enlarged by b times, and the size of the corresponding edge binary image is also enlarged by b times.

The second is to adjust the image rotation angle of the edge binary image.

Specifically, the rotation angle and rotation direction of the edge binary image are adjusted. As shown in FIG. 9, the target image is rotated to the right by c degrees, and the corresponding edge binary image is also rotated to the right by c degrees.

The above two methods may be used at the same time. For example, the size of the target image is reduced by a times and rotated to the right by c degrees, and the size of the corresponding edge binary image is also reduced by a times and rotated to the right by c degrees.

In addition to the above two methods, other methods may also be used to perform the random transformation processing on the edge binary image, such as a random cropping, and the like.

The present disclosure may set the total count of target detection images to generate target detection images. The present disclosure may determine the edge of the specified target by using the edge binary image, and use the cropping technology in the target image to cut out the specified target in the target image. Then fusing the background image and the target image to obtain the candidate target image.

To make the specified target more realistic in the background image, Gaussian smoothing is performed on the edge of the specified target included in the candidate target image according to the edge binary image. Gaussian smoothing processing is the prior art, and details are not repeated here.

In some embodiments, based on the same inventive concept, the embodiment of the present disclosure also provides an apparatus for generating a target detection image. Since the apparatus is the apparatus in the method in the embodiment of the present disclosure, and the principle of the apparatus for solving the problem is the same as that of the method, the implementation of the apparatus may refer to the implementation of the method, and the repetition will not be repeated.

Figure 12:
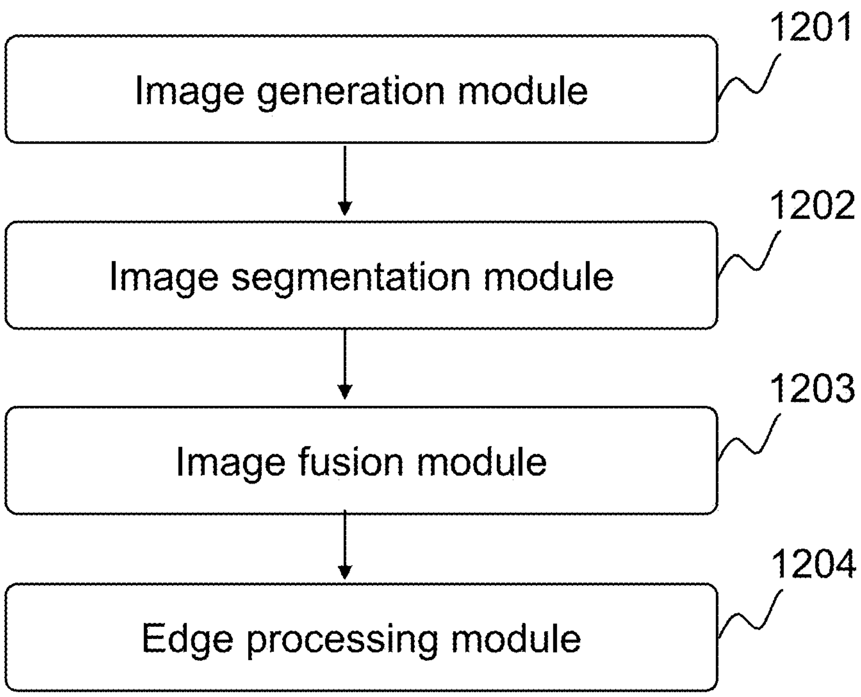
FIG. 12 is a schematic diagram illustrating an exemplary device for generating a target detection image according to some embodiments of the present disclosure.

As shown in FIG. 12, the above apparatus includes the following modules.

An image generation module 1201 is configured to use the generative adversarial network to generate the target image of the specified target.

An image segmentation module 1202 is configured to perform edge feature extraction on the target image to obtain an edge binary image corresponding to the target image.

An image fusion module 1203 is configured to fuse the background image and the target image to obtain the candidate target image.

An edge processing module 1204 is configured to process the edge of the specified target contained in the candidate target image according to the edge binary image to obtain the target detection image corresponding to the target image.

As an optional embodiment, before the image fusion module is configured to fuse the background image and the target image to obtain the candidate target image, the image fusion module may also be configured to perform operations as follows.

The image fusion module may perform a random transformation processing on the target image.

Before the edge processing module is configured to process the edge of the specified target contained in the candidate target image according to the edge binary image to obtain the target detection image corresponding to the target image, the edge processing module may also be configured to perform operations as follows.

The edge processing module may perform a random transformation processing on the edge binary image.

As an optional embodiment, the random transformation processing includes at least one of a noise processing, an image size adjustment, and an image rotation angle adjustment.

As an optional embodiment, when the random transformation processing includes the image size adjustment, the size of the target image and the edge binary image for the image size adjustment is less than or equal to the size of the background image.

As an optional embodiment, the image fusion module is configured to fuse the background image and the target image to obtain the candidate target image, which includes the following operations.

The image fusion module may determine the fusion region of the specified target in the background image.

The pixels corresponding to the fusion region in the background image are replaced with the pixels corresponding to the target image to obtain the candidate target image.

As an optional embodiment, the image fusion module is configured to determine the fusion region of the specified target in the background image, which includes the following operations.

The image fusion module may determine the fusion region with the same size and rotation angle as the specified target in the region occupied by the background image.

As an optional embodiment, the image segmentation module is configured to perform edge feature extraction on the target image to obtain an edge binary image corresponding to the target image, which includes the following operations.

The target image may be input into a target edge segmentation network to extract edge features, and an edge binary image corresponding to the target image output by the target edge segmentation network may be obtained.

As an optional embodiment, the GAN includes a generator and a discriminator, and the adversarial generative network is trained in the following ways.

A first set of training samples is obtained, where the first set of training samples includes a plurality of first sample images with targets.

Each first sample image in the first set of training samples is input into the generator, to obtain the corresponding second sample image output by the generator, as a second set of training samples.

The first sample images in the first set of training samples and the corresponding second sample images in the second set of training samples are input to the discriminator, respectively, to distinguish, and the second sample image that cannot be distinguished by the discriminator is output as the goal to train the generative adversarial network.

As an optional embodiment, the target edge segmentation network is trained in the following ways.

A third set of training samples is obtained, where the third set of training samples includes a plurality of sample images with the edge binary images.

Each sample image in the third set of training samples is input into the segmentation model of the target edge, using the segmentation model of the target edge to extract edge features and predict the edge binary image, and the corresponding edge binary image of the sample image is output as the goal to train the segmentation model of the target edge.

As an optional embodiment, the edge processing module is configured to process the edge of the specified target contained in the candidate target image according to the edge binary image, which includes the following operations.

Gaussian smoothing is performed on the edge of the specified target included in the candidate target image according to the edge binary image.

In some embodiments, based on the same inventive concept, the embodiment of the present disclosure also provides an electronic device for generating a target detection image. Since the electronic device is the electronic device in the method in the embodiment of the present disclosure, and the principle of the electronic device for solving the problem is the same as that of the method, the implementation of the electronic device may refer to the implementation of the method, and the repetition will not be repeated.

An electronic device 1300 according to the embodiment of the present disclosure is described with reference to FIG. 13. The electronic device 1300 shown in FIG. 13 is merely by way of example, and should not impose any limitation on the functions and scope of use of the embodiments of the present disclosure.

Figure 13:
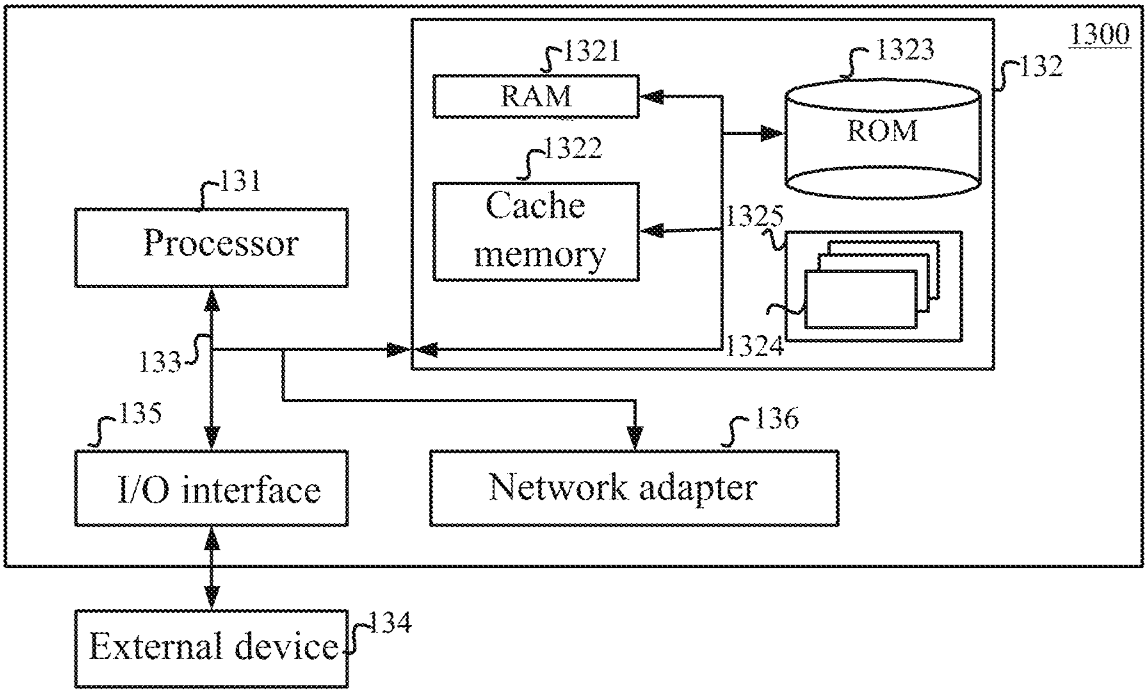
FIG. 13 is a schematic diagram illustrating an exemplary electronic device of a process for generating a target detection image according to some embodiments of the present disclosure.

As shown in FIG. 13, the electronic device 1300 may be represented in the form of a general purpose computing device, for example, it may be a terminal device. Components of the electronic device 1300 may include, but are not limited to, the above-mentioned at least one processor 131, the above-mentioned at least one memory 132 storing processor to execute instructions, and a bus 133 connecting different system components (including the memory 132 and the processor 131).

The processor implements the following operations by running the executable instructions.

The processor may use the generative adversarial network to generate the target image of the specified target.

The processor may perform an edge feature extraction on the target image to obtain an edge binary image corresponding to the target image.

The processor may fuse the background image and the target image to obtain the candidate target image.

The processor may process the edge of the specified target contained in the candidate target image according to the edge binary image to obtain the target detection image corresponding to the target image.

As an optional embodiment, before fusing the background image and the target image to obtain the candidate target image, the executable instructions may further include following operations.

The processor may perform a random transformation processing on the target image.

Before processing the edge of the specified target contained in the candidate target image according to the edge binary image to obtain the target detection image corresponding to the target image, the executable instructions may further include following operations.

The processor may perform a random transformation processing on the edge binary image.

As an optional embodiment, the random transformation processing includes at least one of a noise processing, an image size adjustment, and an image rotation angle adjustment.

As an optional embodiment, when the random transformation processing includes the image size adjustment, the size of the target image and the edge binary image for the image size adjustment is less than or equal to the size of the background image.

As an optional embodiment, the processor may fuse the background image and the target image to obtain the candidate target image, which includes the following steps.

The processor may determine the fusion region of the specified target in the background image.

The pixels corresponding to the fusion region in the background image are replaced with the pixels corresponding to the target image to obtain the candidate target image.

The processor may determine the fusion region of the specified target in the background image, which includes the following operations.

The processor may determine the fusion region with the same size and rotation angle as the specified target in the region occupied by the background image.

As an optional embodiment, the processor may perform edge feature extraction on the target image to obtain an edge binary image corresponding to the target image, which includes the following operations.

The target image may be input into a target edge segmentation network to extract edge features, and an edge binary image corresponding to the target image output by the target edge segmentation network may be obtained.

As an optional embodiment, the GAN includes a generator and a discriminator, and the adversarial generative network is trained in the following ways.

The processor may obtain a first set of training samples, where the first set of training samples includes a plurality of first sample images with targets.

The processor may input each first sample image in the first set of training samples into the generator, to obtain the corresponding second sample image output by the generator, as a second set of training samples.

The first sample images in the first set of training samples and the corresponding second sample images in the second set of training samples are input to the discriminator, respectively, to distinguish, and the second sample image that cannot be distinguished by the discriminator is output as the goal to train the generative adversarial network.

As an optional embodiment, the target edge segmentation network is trained in the following ways.

The processor may obtain a third set of training samples, where the third set of training samples includes a plurality of sample images with the edge binary images.

The processor may input each sample image in the third set of training samples into the segmentation model of the target edge, using the segmentation model of the target edge to extract edge features and predict the edge binary image, and the processor may output the corresponding edge binary image of the sample image as the goal to train the segmentation model of the target edge.

As an optional embodiment, the processor may process the edge of the specified target contained in the candidate target image according to the edge binary image, which includes the following operations.

Gaussian smoothing is performed on the edge of the specified target included in the candidate target image according to the edge binary image.

The bus 133 represents one or more of several types of bus structures, including a memory bus or a memory controller, a peripheral bus, a processor, or a local bus using any of a variety of bus structures.

The memory 132 may include readable medium in the form of volatile memory, such as a random access memory (RAM) 1321 and/or a cache memory 1322, and may further include a read only memory (ROM) 1323.

The memory 132 may also include a program/utility 1325 having a set (at least one) of program modules 1324 including, but not limited to, an operating system, one or more application programs, other program modules, and program data, which the implementation of the network environment may be included in each or some combination of the examples.

The electronic device 1300 may also be in communication with one or more external devices 134 (e.g., keyboards, pointing devices, etc.), may also be in communication with one or more devices that enable a user to interact with electronic device 1300, and/or with any device (e.g., router, modem, etc.) that enables electronic device 1300 to be in communication with one or more other computing devices. Such communication may take place through an input/output (I/O) interface 135. The electronic device 1300 may be in communication with one or more networks (e.g., a local area network (LAN), a wide area network (WAN), and/or a public network such as the Internet) through a network adapter 136. As shown in FIG. 13, the network adapter 136 may be in communication with other modules of the electronic device 1300 via the bus 133. It should be understood that, although not shown in FIG. 13, other hardware and/or software modules may be used in conjunction with electronic device 1300, including but not limited to, a microcode, a device driver, a redundant processing unit, an external disk drive array, a RAID system, a tape driver and a data backup storage system.

In some possible embodiments, various aspects of the present disclosure may also be implemented in the form of a program product, which includes a program code, when the program product is run on a terminal device, the program code is used to cause the terminal device to execute the above-mentioned instructions in the present disclosure. The steps of each module in the apparatus for generating a target detection image according to various exemplary embodiments of the present disclosure described in the "exemplary method" section. For example, the terminal device may be configured to use the generative adversarial network to generate the target image of the specified target; perform edge feature extraction on the target image to obtain an edge binary image corresponding to the target image; fuse the background image and the target image to obtain the candidate target image; process the edge of the specified target contained in the candidate target image according to the edge binary image to obtain the target detection image corresponding to the target image.

The program product may employ any combination of one or more readable mediums. The readable medium may be a readable signal medium or a readable storage medium. The readable storage medium may be, for example, but not limited to, an electrical, magnetic, optical, electromagnetic, infrared, or semiconductor system, apparatus or device, or a combination thereof. More specific examples (non-exhaustive list) of readable storage medium include: an electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

Figure 14:
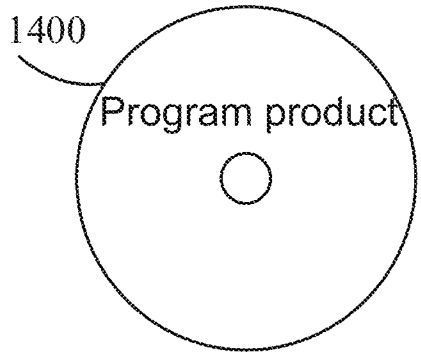
FIG. 14 is a schematic diagram illustrating an exemplary program product of a process for generating a target detection image according to some embodiments of the present disclosure.

As shown in FIG. 14, a program product 1400 for generating a target detection picture according to an embodiment of the present disclosure is described, which may adopt the portable compact disk read only memory (CD-ROM) and include program codes, and may be stored in a terminal device, for example, running on a personal computer. However, the program product of the present disclosure is not limited thereto, and in the present disclosure, a readable storage medium may be any tangible medium that contains or stores a program that may be used by or in conjunction with an instruction execution system, apparatus, or device.

The readable signal medium may include a propagated data signal in baseband or as part of a carrier wave, carrying readable program code therein. Such propagated data signals may take a variety of forms including, but not limited to, electromagnetic signals, optical signals, or any suitable combination thereof. The readable signal medium may also be any readable medium, other than a readable storage medium, that may transmit, propagate, or transport the program that may be used by or in conjunction with an instruction execution system, apparatus, or device.

Program code embodied on a readable medium may be transmitted using any suitable medium including, but not limited to, wireless, wireline, optical fiber cable, RF, etc., or any suitable combination thereof.

The program code for carrying out operations of the present disclosure may be written in any combination of one or more programming languages. Programming languages include object-oriented programming languages, such as Java, C++, etc., and conventional procedural programming languages, such as the "C" language or similar programming languages. The program code may execute entirely on a user's computing device, partly on the user's computing device, as a standalone software package, partly on the user's computing device and partly on a remote computing device, or entirely on the remote computing device or a server. Where remote computing devices are involved, the remote computing devices may be connected to the user's computing device through any kind of network, including a local area network (LAN) or a wide area network (WAN), or may be connected to an external computing device (e.g., using Internet service provider to connect via the Internet).

It should be noted that although several modules or sub-modules of the system are mentioned in the above detailed description, this division is merely exemplary and not mandatory. Indeed, in accordance with embodiments of the present disclosure, the features and functions of two or more modules described above may be embodied in one module. Conversely, the features and functions of one module described above may be further divided into multiple modules to be embodied.

Additionally, although the operations of the various modules of the disclosed system are depicted in the figures in a particular order, this does not require or imply that the operations must be performed in the particular order, or that all illustrated operations must be performed to achieve the desired result. Additionally or alternatively, certain operations may be omitted, multiple operations may be combined into one operation performance, and/or one operation may be decomposed into multiple operation performances.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for image generation implemented on a machine including one or more processors and one or more storage devices, comprising: obtaining an initial image, the initial image being an image generated by a generator and including a specified target; determining, in the initial image, a partial image of the specified target; obtaining an edge result of the partial image of the specified target through a target edge segmentation network based on the initial image; generating a fusion image including the specified target by performing an image fusion based on a background image and the partial image of the specified target; and generating a target sample image based on the fusion image, including: generating the target sample image by performing, based on the edge result, an optimization processing on the specified target in the fusion image, the optimization processing including one or more of the following: performing an edge smoothing on the specified target, performing a brightness adjustment on the specified target or the background image, performing a color adjustment on the specified target or the background image, or performing a sharpness adjustment on the specified target or the background image.

2. The method of claim 1, wherein generating the fusion image including the specified target by performing the image fusion based on the background image and the partial image of the specified target includes:

generating a changed partial image of the specified target by performing a change processing on the partial image of the specified target, the change processing including one or more of the following: a size change, a rotation change, a noise addition, an image brightness change, an image color change, an image sharpness change, or an image cropping; and generating the fusion image by performing an image fusion based on the background image and the changed partial image of the specified target.

3. The method of claim 1, wherein generating the target sample image by performing, based on the edge result, the optimization processing on the specified target in the fusion image includes: generating the target sample image through an image optimization model based on the edge result and the fusion image.

4. The method of claim 1, wherein the edge result includes an edge binary image.

5. The method of claim 1, wherein a training process of the generator includes training a generative adversarial network including the generator and a discriminator.

6. The method of claim 1, wherein the target sample image including a plurality of specified targets is generated by performing a plurality of iterations of the method, in the plurality of iterations, the background image in a first iteration being a specified background image, the background image in an Nth iteration being the target sample image obtained in a previous iteration, and N being an integer greater than 1.

7. A system for generating an image, comprising: at least one storage device including a set of instructions; and at least one processor in communication with the at least one storage device, wherein when executing the set of instructions, the at least one processor is directed to perform operations including: obtaining an initial image, the initial image being an image generated by a generator and including a specified target; determining, in the initial image, a partial image of the specified target; obtaining an edge result of the partial image of the specified target through a target edge segmentation network based on the initial image; generating a fusion image including the specified target by performing an image fusion based on a background image and the partial image of the specified target; and generating a target sample image based on the fusion image, including: generating the target sample image by performing, based on the edge result, an optimization processing on the specified target in the fusion image, the optimization processing including one or more of the following: performing an edge smoothing on the specified target, performing a brightness adjustment on the specified target or the background image, performing a color adjustment on the specified target or the background image, or performing a sharpness adjustment on the specified target or the background image.

8. The system of claim 7, wherein the at least one processor is directed to perform operations including:

generating a changed partial image of the specified target by performing a change processing on the partial image of the specified target, the change processing including one or more of the following: a size change, a rotation change, a noise addition, an image brightness change, an image color change, an image sharpness change, or an image cropping; and generating the fusion image by performing an image fusion based on the background image and the changed partial image of the specified target.

9. The system of claim 7, wherein the at least one processor is directed to perform operations including: generating the target sample image through an image optimization model based on the edge result and the fusion image.

10. The system of claim 7, wherein the edge result includes an edge binary image.

11. The system of claim 7, wherein the at least one processor is directed to perform operations including: training the generator, wherein a training of the generator includes training a generative adversarial network including the generator and a discriminator.

12. The system of claim 7, wherein the at least one processor is directed to perform operations including: generating the target sample image including a plurality of specified targets by performing a plurality of iterations of the method; and in the plurality of iterations, the background image in a first iteration being a specified background image, the background image in an Nth iteration being the target sample image obtained in a previous iteration, and N being an integer greater than 1.

13. A non-transitory computer readable medium, comprising at least one set of instructions, wherein when executed by one or more processors of a computing device, the at least one set of instructions causes the computing device to perform a method, the method comprising: obtaining an initial image, the initial image being an image generated by a generator and including a specified target; determining, in the initial image, a partial image of the specified target; obtaining an edge result of the partial image of the specified target through a target edge segmentation network based on the initial image; generating a fusion image including the specified target by performing an image fusion based on a background image and the partial image of the specified target; and generating a target sample image based on the fusion image, including: generating the target sample image by performing, based on the edge result, an optimization processing on the specified target in the fusion image, the optimization processing including one or more of the following: performing an edge smoothing on the specified target, performing a brightness adjustment on the specified target or the background image, performing a color adjustment on the specified target or the background image, or performing a sharpness adjustment on the specified target or the background image.

14. The non-transitory computer readable medium of claim 13, wherein generating the fusion image including the specified target by performing the image fusion based on the background image and the partial image of the specified target includes:

generating a changed partial image of the specified target by performing a change processing on the partial image of the specified target, the change processing including one or more of the following: a size change, a rotation change, a noise addition, an image brightness change, an image color change, an image sharpness change, or an image cropping; and generating the fusion image by performing an image fusion based on the background image and the changed partial image of the specified target.

15. The non-transitory computer readable medium of claim 13, wherein generating the target sample image by performing, based on the edge result, the optimization processing on the specified target in the fusion image includes: generating the target sample image through an image optimization model based on the edge result and the fusion image.

16. The non-transitory computer readable medium of claim 13, wherein the edge result includes an edge binary image.

17. The non-transitory computer readable medium of claim 13, wherein a training process of the generator includes training a generative adversarial network including the generator and a discriminator.

18. The non-transitory computer readable medium of claim 13, wherein the target sample image including a plurality of specified targets is generated by performing a plurality of iterations of the method, in the plurality of iterations, the background image in a first iteration being a specified background image, the background image in an Nth iteration being the target sample image obtained in a previous iteration, and N being an integer greater than 1.

* * * * *